United States Patent
Grigsby et al.

(10) Patent No.: US 7,515,703 B1
(45) Date of Patent: Apr. 7, 2009

(54) METHOD AND SYSTEM FOR DETERMINING CONFERENCE CALL EMBELLISHMENT TONES AND TRANSMISSION OF SAME

(75) Inventors: Travis M. Grigsby, Austin, TX (US); Steven Michael Miller, Cary, NC (US); Lisa Anne Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/123,382

(22) Filed: May 19, 2008

(51) Int. Cl.
*H04M 1/00* (2006.01)
*H04M 9/00* (2006.01)

(52) U.S. Cl. .............. 379/392.01; 379/202.01; 379/406.01; 381/71.1; 381/93; 381/94.1; 381/94.2; 367/901

(58) Field of Classification Search ........... 379/392.01, 379/202.01, 406.01; 381/71.1, 93, 94.1, 381/94.2; 367/901
See application file for complete search history.

(56) References Cited

U.S. PATENT DOCUMENTS

| | | | |
|---|---|---|---|
| 5,680,393 A | 10/1997 | Bourmeyster | |
| 7,110,465 B2 | 9/2006 | Kaku | |
| 7,242,781 B2 | 7/2007 | Hou | |
| 2002/0064287 A1* | 5/2002 | Kawamura et al. | 381/92 |
| 2004/0076277 A1* | 4/2004 | Kuusinen et al. | 379/202.01 |
| 2007/0253574 A1 | 11/2007 | Soulodre | |

* cited by examiner

*Primary Examiner*—Quynh H Nguyen
(74) *Attorney, Agent, or Firm*—Shimokaji & Associates, PC

(57) ABSTRACT

A method for providing an embellishment representation of a noise information is discloses. The method comprises measuring a level of the background noise information, wherein the measured level is indicative of a number of people causing the background noise information; determining at least one background noise information characteristic based on the measured background noise information; selecting a dominant one of the determined at least one background noise information characteristic; associating the selected background noise characteristic with a predetermined representation of the selected background noise characteristic; determining a level of the dominant characteristic within the measured level of the background noise information; enhancing the predetermined representation of the selected background noise characteristic based on the determined level of the dominant characteristic within the background noise information; and transmitting the enhanced predetermined representation of the selected background noise characteristic and suppressing the background noise information.

1 Claim, 2 Drawing Sheets

METHOD AND SYSTEM FOR DETERMINING CONFERENCE CALL EMBELLISHMENT TONES AND TRANSMISSION OF SAME

RELATED APPLICATIONS

This application is related to US patent application entitled "Enlivening Conference Calls to Make Conference Calls More Interesting For Participants," filed on Mar. 8, 2008 and afforded Ser. No. 12/044,942, the contents of which are incorporated by reference herein.

BACKGROUND OF THE INVENTION

The present invention relates to teleconference systems, and more particularly to a system and method for injecting pre-canned information regarding determined verbal reactions of participants that are parties to the call.

Teleconference systems, or simply "conference call systems," bring multiple parties together from remote locations. Ideally, teleconference systems allow participants to communicate with each other as if they were seated in the same room. A teleconference system includes at least two stations (e.g., mobile telephone, landline telephone) set up in remote rooms or locations interconnected by a transmission system, such as a global network or a telephone system.

Participants at each of the stations communicate with each other through audio equipment. Audio equipment for each station typically includes one or more microphones, speakers, and the like.

In some case, participants at a remote site may be a muted state to reduce the level of noise or participation of the participants or to provide a speaker with an ability to continue speaking in an uninterruptable manner.

However, when the participants are in a muted state, the speaker is not provided with any indication that the message being provided is received without un-muting the participants. Thus, if a participant reacts to the speaker's message, the speaker is not able to hear the participants' reaction unless the participant un-mutes the device that is muting the call. This continuous need to mute and un-mute the call is both inconvenient and a burden on the participants in the call.

Hence, there is a need in the industry of providing a speaker or other participants in a conference call a feedback even when some or all of the participants are in a muted mode.

SUMMARY OF THE INVENTION

A method for providing an embellishment representation of a background noise information comprises: measuring a level of the background noise information, wherein the measured level is indicative of a number of people causing the background noise information; determining at least one background noise information characteristic based on the measured background noise information; selecting a dominant one of the determined at least one background noise information characteristic; associating the selected background noise characteristic with a predetermined representation of the selected background noise characteristic; determining a level of the dominant characteristic within the measured level of the background noise information; enhancing the predetermined representation of the selected background noise characteristic based on the determined level of the dominant characteristic within the background noise information; and transmitting the enhanced predetermined representation of the selected background noise characteristic and suppressing the background noise information.

These and other features, aspects and advantages of this invention of the present invention will become better understood with reference to the following drawings, description, and claims.

DETAILED DESCRIPTION

Figure 1:
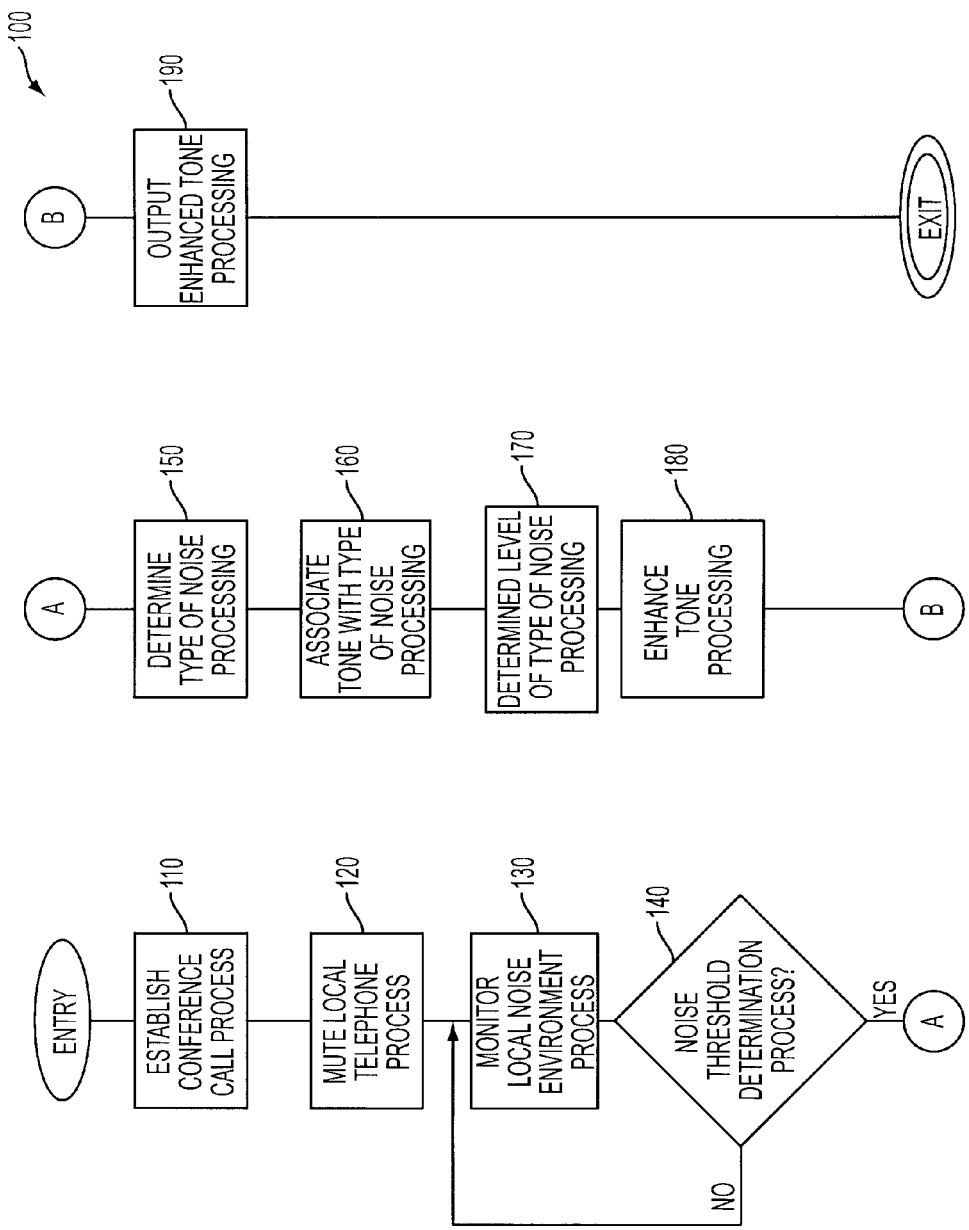
FIG. 1 illustrates a flow chart of an exemplary process for providing feedback on muted calls in accordance with an embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features describe below.

Broadly, embodiments of the present invention provide a method and apparatus for providing feedback within a conference call system when the participants are muted and do not have direct access to provide their reaction to a speaker's message. The system provides for monitoring the local sound or noise environment at a local call site that is muted and determining participant reaction. The reactions are then converted to predetermined responses that are transmitted to the speaker.

It would be recognized by those skilled in the art that the invention described herein can take the form of an entirely hardware embodiment, an entirely software embodiment, or an embodiment containing both hardware and software elements. In an exemplary embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The invention is suitable for storing and/or executing program code and can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

FIG. 1 is a flow chart of an exemplary process 100 in accordance with an embodiment of the invention. In this exemplary process, a conference call can be established among a plurality of call participants at block 110. Conference call setup is well-known in the art and need not be discussed herein. At block 120, the call, at a local site, is muted. At block 130, processing monitors the environment at the local site, with regard to sounds and noise. At block 140, a determination is made whether the sound/noise environment has changed. For example, with the call muted, the participants at the site may be engaged in local conversation that establishes a baseline background noise environment. If the monitored noise fails to exceed a known threshold, the processing continues to monitor the environment at step 130.

However, if the noise level exceeds a known threshold, then processing continues to step 150 where at least one characteristic of the measured noise environment is determined. For example, a characteristic, such as laughter, crying, booing, cheering, screaming, yelling, dog barking, or similar distinctive emotional response or noise may be determined. In one aspect, silence may be classified as a noise for the purposes of being a characteristic. When more than one characteristic is determined in the background noise environment, e.g., laughter and crying, then a dominate characteristic is selected. The dominate characteristic may be determined, for example, based on a measured noise level of each characteristic within the background noise environment. For example, the dominate characteristic may be determined as that characteristic having the highest measured noise level within the measured background noise environment.

At step 160, a predetermined representation message is associated with the determined dominate characteristic. The predetermined representation may be an embellishment tone associated with the determined dominate characteristic. For example, when laughter is detected within the environment, a laughter embellishment tone may be associated with the detected laughter. The represented laughter may be selected from different types of predetermined laughs or tones. The association may be preformed using a well-known table lookup method wherein predetermined values are stored in a table of values and the determined dominate characteristic is used to access the table. Such table-lookup methods are well-known in the art and need not be discussed in detail herein.

At step 170, a determination is made with regard to the number of different participants that are exhibiting the dominate characteristics. That is, the processing determines the number of participants that are laughing. In one aspect, the number may be determined based on a measured level of the dominate characteristics within the measured noise level. For example, if all the participants are laughing then the measured level on the laughter is comparable to the measured level of the background noise environment. As would be recognized, an exact number of the participants need not be determined to enhance the representative tone. Rather a relative determination is sufficient.

At block 180, the predetermined presentation may be enhanced by the determined number of determined participants exhibiting the dominant characteristic. Thus, the volume level a predetermined representations may be increased dependent upon the determined number of participants exhibiting the dominant characteristic. In another aspect, one or more different predetermined representations may be transmitted. Each representation having a volume level associated with its level within the measured background noise environment.

At block 190, at least one predetermined characteristic representation, (i.e., embellishment tone) enhanced by the number of participants exhibiting the characteristic, is output to the conference call without un-muting the local site. In another aspect of the invention, a number or a percentage of those participants exhibiting at least one characteristic may be determined and a number or percentage of such participants may be transmitted for a audio or visual presentation.

Although, the present invention has been described with regard to a dominate characteristic, it would be recognized by those skilled in the art that more than one embellishment tone may be transmitted, wherein embellishment tones associated with different characteristics are outputted based on their relative volume level within the background noise environment.

Figure 2:
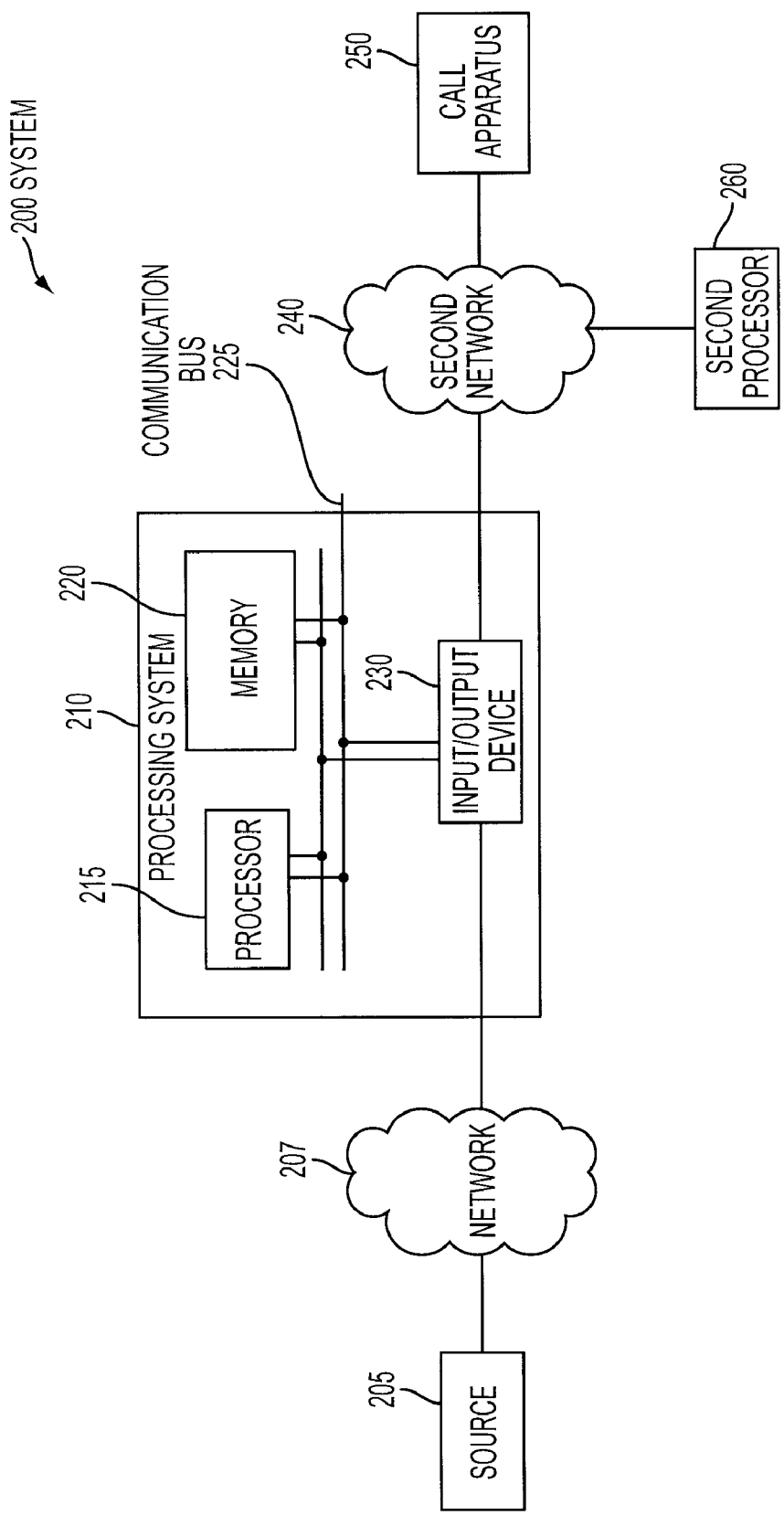
FIG. 2 illustrates a system for implementing the process shown in FIG. 1.

FIG. 2 illustrates an exemplary system 200 for implementing the method shown in FIG. 1. In this exemplary system, information regarding the background noise environment may be provided by source(s) 205 via network 207 to a processing system 210. The sources may, for example, be audio detector devices such as microphones distributed throughout the environment. Network 207 may be a wired or wireless network. Processing system 210 includes a processor 215, a memory 220 and an Input/output device 230 that are in communication via a communication bus 225. Memory 220 may include code or software instructions which when accessed by processor 215 may instruct processor 215 to execute the steps shown in FIG. 1. I/O device 230 may then communicate the result(s) of the processing performed by processor 215 to the conference call apparatus 250 via network 240. Network 207 and 240 may be the same or different networks of the same or different types. The information may also be provided to second processor 260 for subsequent analysis and processing.

As can be appreciated by those skilled in the art, the present invention provides an improved device and method for providing information to drivers in vehicles in a line of vehicles, when the drivers may not have visible access to vehicles other than the one vehicle immediately preceding the driver's vehicle.

It should be understood, of course, that the foregoing relates to exemplary embodiments of the invention and that modifications may be made without departing from the spirit and scope of the invention as set forth in the following claims.

What is claimed is:

1. A method, operable in a computer system, for determining a background noise information in a conference situation and providing a representation of said background noise information comprising:

measuring a level of said background noise information, said level of background noise information providing an indication of a number of people within said conference situation;

determining at least one background noise information characteristic from said measured background noise information;

selecting at least one of said determined at least one background noise information characteristic;

associating said selected at least one background noise characteristic with a predetermined representation of said selected background noise characteristic;

determining a level of said selected at least one background noise characteristic within said measured level of said background noise information, wherein said determined level being indicative of a number of people causing said background noise characteristic with regard to said indication of a number of people causing said background noise information;

enhancing said predetermined representation of said selected at least one background noise characteristic based on said determined level of said at least one background noise characteristic within the background noise information; and transmitting said selected at least one enhanced predetermined representation of said selected background noise characteristic and suppressing said background noise information.

* * * * *